(No Model.)
G. W GRIFFIN.
HACK SAW.
No. 589,719. Patented Sept. 7, 1897.
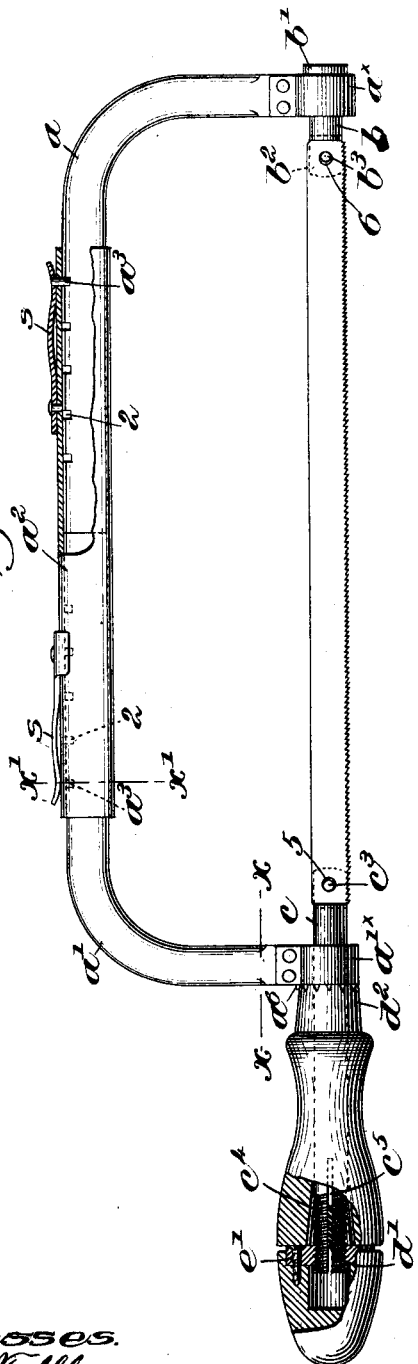
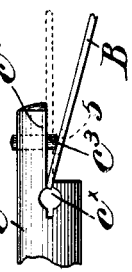
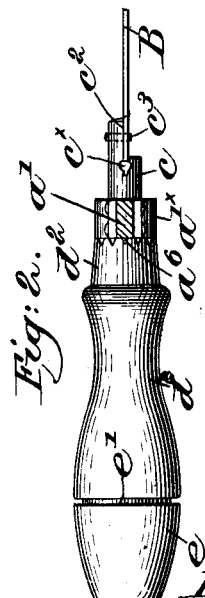
Witnesses.
Edward F. Allen.
Thomas F. Drummond.
Inventor:
George W. Griffin.
By Crosby Gregory
Attys

UNITED STATES PATENT OFFICE.

GEORGE W. GRIFFIN, OF FRANKLIN, NEW HAMPSHIRE.

HACK-SAW.

SPECIFICATION forming part of Letters Patent No. 589,719, dated September 7, 1897.

Application filed April 16, 1896. Serial No. 587,767. (No model.)

*To all whom it may concern:*

Be it known that I, GEORGE W. GRIFFIN, of Franklin, county of Merrimac, and State of New Hampshire, have invented an Improvement in Hack-Saws, of which the following description, in connection with the accompanying drawings, is a specification, like letters and figures on the drawings representing like parts.

This invention has for its object the production of a novel and useful saw, comprising a frame adjustable to receive detachable blades of different lengths and means for holding the blade securely in place.

The blade may be set and held at any desired angle relative to the length of the frame, novel means being mounted in the handle of the frame to hold the blade under tension and in adjusted position.

Figure 1, in side elevation and partially in section, shows a saw embodying my invention. Fig. 2 is a partial detail thereof, taken below the line $xx$, Fig. 1. Fig. 3 is a transverse sectional view taken on the line $x'x'$, Fig. 1, of the back of the frame; and Fig. 4 is an enlarged detail of one of the blade-holders, showing the manner of inserting the blade.

Referring to Fig. 1, the frame is shown as made in two like separable members $a\,a'$, bent laterally at their outer ends and having sleeve-like hubs or bearings $a^\times\,a'^\times$ for the blade-holders $b\,c$.

Preferably the members $a\,a'$ are flattened, as shown in Fig. 3, correspondingly shaped, and a sleeve $a^2$ is slipped over them, inclosing their adjacent inner ends, which latter are provided, one or both, with a series of notches 2 to receive a locking-dog $a^3$, herein shown as on a spring $s$, secured to the sleeve $a^2$. The dog $a^3$ extends through a hole in the sleeve and by engaging one or other of the notches 2 maintains the members of the frame more or less extended, the sleeve $a^2$ being herein shown as provided with a locking-dog for each member of the frame.

The blade clip or holder $b$ is shown as having a cylindrical body to enter the bearing $a^\times$ and a retaining-head $b'$ to rest against the outer side of said bearing, the holder being slabbed off at its inner end at $b^2$ and provided with a lug or pin $b^3$, projecting from the face thereof.

The holder $c$ is shown as cylindrical to enter the bearing $a'^\times$, and it is also slabbed off at its inner end at $c^2$ (see Figs. 2 and 4) and provided with a pin $c^3$, projecting therefrom, as described of the holder $b$.

Each holder is recessed or slotted transversely and similarly, and only the holder $c$ is described in full, the recess, as $c^\times$, being clearly shown in Figs. 2 and 4 at the end of the slabbed-off portion $c^2$, forming a species of keyhole-slot.

When the blade $b$ is to be applied to the frame, one end is inserted in the transverse recess or slot of one of the holders, as in full lines, Fig. 4, and pushed in until the hole 5 is brought into position to receive the pin $c^3$, when the blade is moved up into dotted-line position, Fig. 4, against the part $c^2$, the enlarged portion of the slot permitting such movement of the blade. The other end of the blade is similarly attached to the holder $b$, the pin $b^3$ entering the hole 6 in the blade, which latter is thus held from accidental detachment by the slot-and-pin arrangement described, the holes 5 and 6 being made somewhat larger than the diameter of the pins $b^3\,c^3$.

The handle $d$ of the frame is loosely mounted on the extended shank of the holder $c$, which shank is threaded at $c^4$ and longitudinally slit at $c^5$ to receive a cross pin or bar $d'$, fast on the handle, so that the latter will turn with the holder $c$, but permitting longitudinal movement of one relatively to the other.

A lug $a^6$ on the outer side of the bearing $a'^\times$ is adapted to enter any one of a series of notches in the face of a ring or band $d^2$ on the handle, so that when it is held the saw-blade B will be prevented thereby from turning.

A cap $e$ is provided with a threaded nut or collar $e'$ to be screwed onto the threaded end $c^4$ of the bearing $c$ and against the outer end of the handle $d$, to thereby press the latter toward the bearing $a'^\times$ and strain or tighten the blade B to the desired extent. Thus the cap $e$ not only acts to tighten the blade, but it also prevents rotative movement thereof about its longitudinal axis.

It is a very simple matter to remove or apply a blade to the frame, and the latter is readily adjustable to blades of different lengths, the inclosing sleeve $a^2$ holding the frame members from relative movement laterally or longitudinally.

Having fully described my invention, what

I claim, and desire to secure by Letters Patent, is—

1. A blade-holder for saw-frames, cut away longitudinally at its inner end to form a rest for the side of the blade, and a pin extended from said rest to engage a hole in the blade, said holder having a transverse keyhole-slot therein at the base of the cut-away portion, thereby leaving a lip to overlap the end of the blade while said end turns in the enlarged part of the keyhole-slot whereby the blade may be moved to bring it into place on the holder, substantially as described.

2. A frame having a blade-holder transversely slotted and cut away longitudinally from said slot, to its inner end, the slot being interiorly enlarged, a retaining-pin on said cut-away portion, and the blade having a hole therein to receive the pin, the end of the blade at such time entering the recess and being thereby retained in operative position on the holder, substantially as described.

In testimony whereof I have signed my name to this specification in the presence of two subscribing witnesses.

GEORGE W. GRIFFIN.

Witnesses:
FRANK PROCTOR,
J. RAY SARGENT.